G. F. WILLIAMSON.
RAILWAY CHAIR.
APPLICATION FILED MAY 18, 1914.

1,121,216.

Patented Dec. 15, 1914.
8 SHEETS—SHEET 1.

G. F. WILLIAMSON.
RAILWAY CHAIR.
APPLICATION FILED MAY 18, 1914.

1,121,216.

Patented Dec. 15, 1914.
8 SHEETS—SHEET 2.

Witnesses:
W. A. Helfrig
Horace P. Harwood

Inventor:
George F. Williamson
by P. Singer Atty.

G. F. WILLIAMSON.
RAILWAY CHAIR.
APPLICATION FILED MAY 18, 1914.

1,121,216.

Patented Dec. 15, 1914.
8 SHEETS—SHEET 3.

G. F. WILLIAMSON.
RAILWAY CHAIR.
APPLICATION FILED MAY 18, 1914.

1,121,216.

Patented Dec. 15, 1914.
8 SHEETS—SHEET 4.

G. F. WILLIAMSON.
RAILWAY CHAIR.
APPLICATION FILED MAY 18, 1914.

1,121,216.

Patented Dec. 15, 1914.
8 SHEETS—SHEET 5.

Inventor:
George F. Williamson
by B. Singer Atty.

G. F. WILLIAMSON.
RAILWAY CHAIR.
APPLICATION FILED MAY 18, 1914.

1,121,216.

Patented Dec. 15, 1914.
8 SHEETS—SHEET 6.

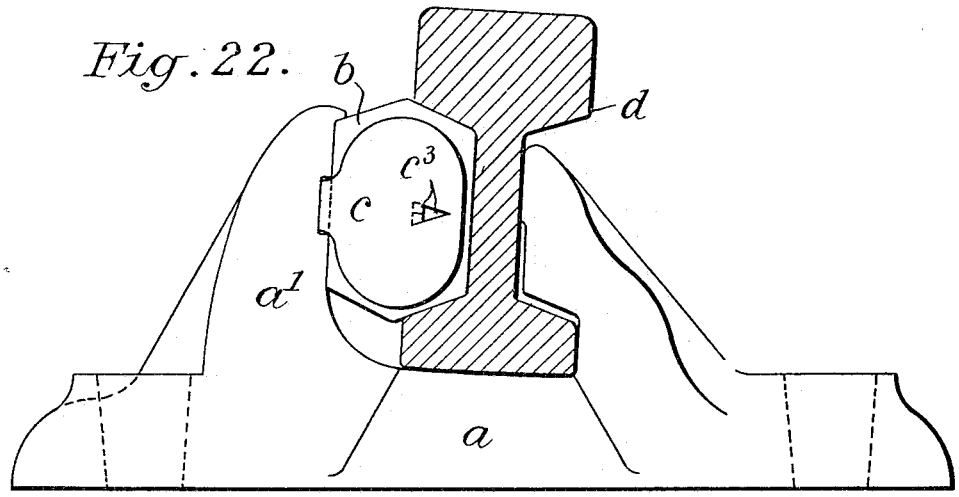
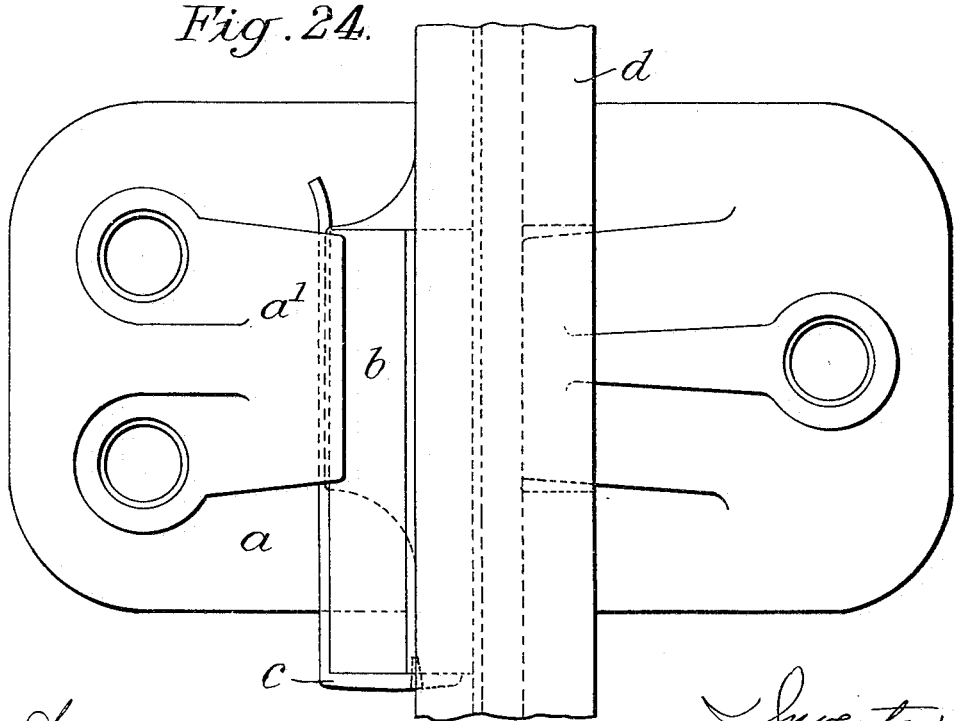

G. F. WILLIAMSON.
RAILWAY CHAIR.
APPLICATION FILED MAY 18, 1914.

1,121,216.

Patented Dec. 15, 1914.
8 SHEETS—SHEET 8.

UNITED STATES PATENT OFFICE.

GEORGE FREDERICK WILLIAMSON, OF WELLINGBOROUGH, ENGLAND.

RAILWAY-CHAIR.

1,121,216.

Specification of Letters Patent.

Patented Dec. 15, 1914.

Application filed May 18, 1914. Serial No. 839,437.

*To all whom it may concern:*

Be it known that I, GEORGE FREDERICK WILLIAMSON, a subject of the King of Great Britain and Ireland, residing at Midland Foundry, Wellingborough, England, have invented certain new and useful Improvements in Railway-Chairs, of which the following is a specification.

This invention for improvements in or relating to railway chairs and securing the keys therein has for its object to provide a means for preventing wedge keys shaking loose and coming out and consists in securing to any usual metal or wooden key a metal locking plate with a prong or prongs and in forming a curved groove or grooves in the chair jaw adapted to receive the prong or prongs as the key is driven home, and to bend the same and thus lock the key in position.

In one practical form of this invention two curved grooves are formed in the inner face of the key side of the chair jaw, the grooves being preferably enlarged at the entering ends for a purpose which will hereinafter appear.

A locking plate provided with prongs corresponding to the grooves is attached to the usual metal or wooden key by a screw or the like and on the key being driven in the prongs bend to follow the curve of the two grooves in the chair jaw.

The invention is hereinafter described with reference to the accompanying drawings in which—

Figure 1 is an end view of a rail chair applied to a rail with the locking plate and key in position, Fig. 2 is a side view of the parts shown in Fig. 1. Fig. 3 is a plan of the same. Fig. 4 is a longitudinal section taken through the base of the chair showing the inner face of the outer jaw in elevation. Figs. 5 to 7 are similar views to Fig. 2 showing the key in first, intermediate and final locking position respectively. Fig. 8 is a side view of the key with the locking plate thereon ready for driving. Fig. 9 is a similar view to Fig. 8 illustrating the bend of the prongs of the locking plate when the key is fully driven in. Fig. 10 is a similar view to Figs. 8 and 9 illustrating the shape of the prongs when the key has been drawn out of the chair. Fig. 11 is an inside elevation of a slightly modified form of locking plate. Fig. 12 is an inside elevation of the chair jaw with which the plate is to be used. Figs. 13 and 14 are elevations of a locking plate and chair jaw of modified form of construction. Fig. 15 illustrates the shape of the locking plate prongs after being driven out. Figs. 16 and 17 illustrate in elevation, modified forms of chair jaws with grooves shaped to receive the locking plates from either end. Figs. 18 to 20 are side elevation, end elevation and plan respectively of a cast iron key to which the locking plate is applicable as shown in dotted lines in Figs. 18 and 19. Fig. 21 is an elevation of the inner face of the key. Figs. 22 to 24 are end elevation, side elevation and plan respectively of a chair with slightly modified form of locking plate, and Fig. 25 is an inside elevation of the grooved chair jaw for receiving the locking plate.

In Figs. 1 to 7 the chair $a$, key $b$ and locking plate $c$ are shown applied to the rail $d$, the key being driven fully home except in Figs. 5 and 6.

As clearly shown in Fig. 4, the outer chair jaw $a$ has two curved grooves $e$ formed in its inner face and running in the direction in which the key is driven, the sides of the grooves being parallel except at the entering ends $e^1$ where the grooves are preferably enlarged as shown. The locking plate $c$ illustrated in detail in Figs. 8 to 10 consists of a sheet steel plate bent at right angles at one end to lie over the end of the key $b$, and having prong-like extensions $c^1$ at the other end intended to enter the grooves $e$ in the chair jaw when the key is driven in between the chair jaw and rail. A screw $f$ is passed through the locking plate for fixing it to the key $b$, and the corners $c^2$ of the bent over part of the plate are also bent to enter the end of the key to assist in holding the plate.

The key $b$ is shown in Fig. 5 in the position it usually occupies when first driven in the chair. In this position the prongs $c^1$ of the locking plate are bent sufficiently by reason of the curvature of the entering ends of the grooves $e$ in the chair jaw to prevent withdrawal of the key. When the key becomes slack and is driven farther in as shown in Fig. 6, the locking action of the grooves $e$ on the prongs $c^1$ is increased by the further bending of the prongs in adapting themselves to the curvature of the grooves. Likewise as the key reaches the positions shown in Fig. 7 or Fig. 2 a further bending of the prongs with correspondingly increased resistance to withdrawal of the same from their grooves results. When desired the keys with the locking plates can be driven or forced out of the chairs without damaging them and used over again. In this case the prongs $c^1$ of the plate $c$ assume the shape shown in Fig. 10, their ends converging so that in order to facilitate their re-insertion in a chair without first straightening them it is necessary to provide the enlargements $e^1$ in the entering ends of the grooves $e$ as shown in Fig. 4. In some cases the locking device may be driven in alone, that is after the key is in position.

In the modified form of construction illustrated in Fig. 11 the locking plate $c$ is formed with a serrated tongue $c^2$ between the prongs $c^1$ with which an inclined surface $g$ provided on the chair jaw, Fig. 12, engages to force the tongue into the wood of the key.

In the form of locking plate illustrated in Figs. 13 and 15 the prongs $c^1$ are closer together as compared with the locking plate previously described and the grooves $e$ in the chair jaws $a^1$ are modified in shape, their sides forming simple curves merging into a common entering groove $e^3$ Fig. 14. Instead of bending in the corners a single spur $c^3$ is provided on the edge of the plate $c$ to assist in fixing it to the key.

Figure 1:
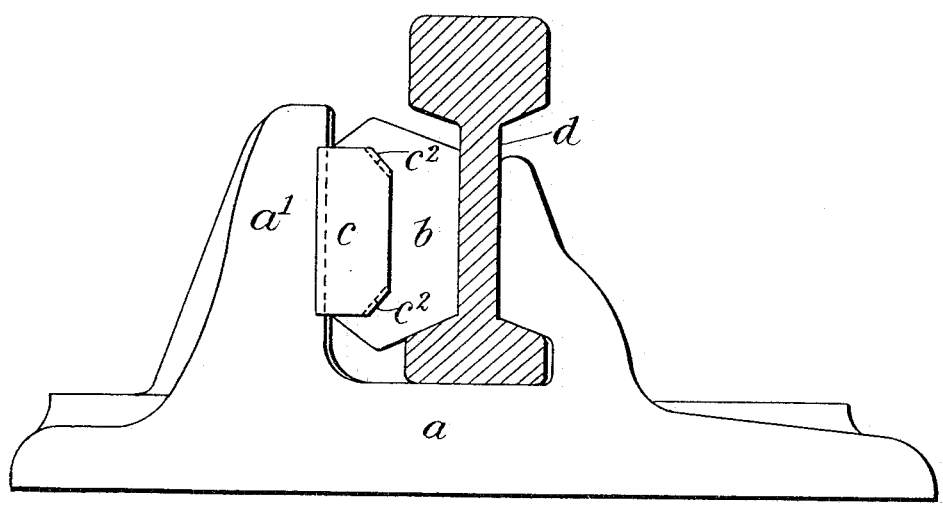
Figure 3:
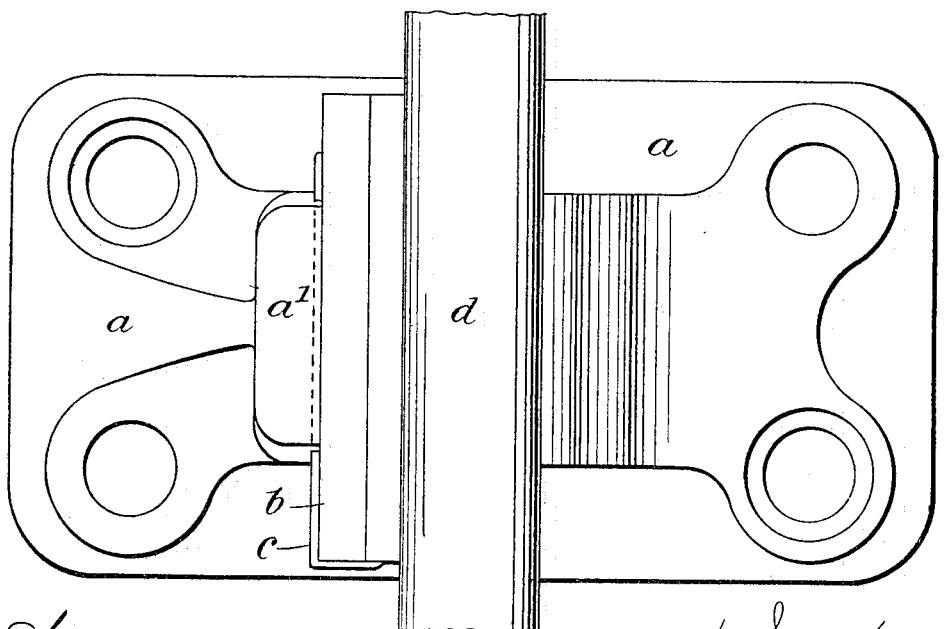
Figure 2:
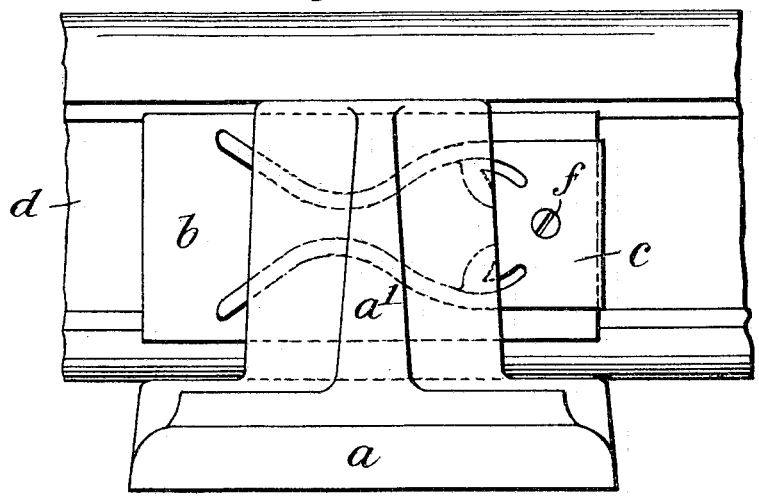
Figure 4:
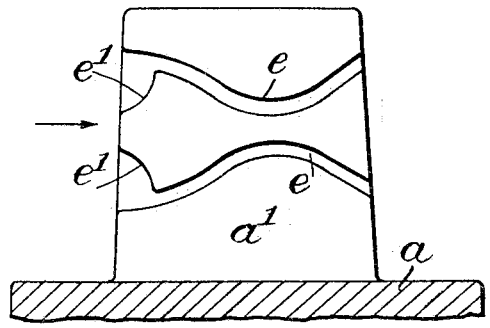
Figure 5:
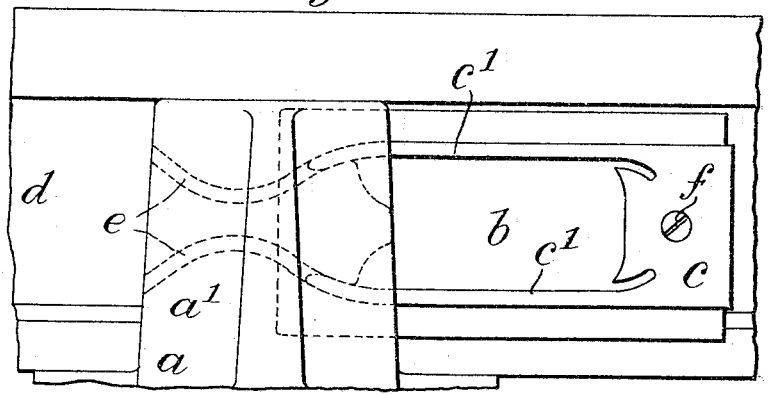
Figure 6:
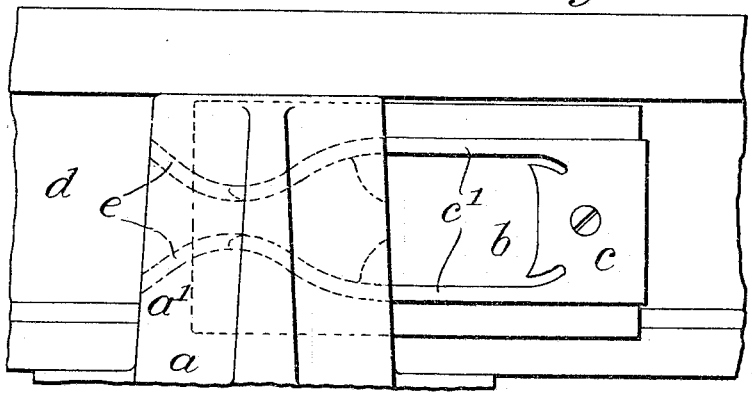
Figure 7:
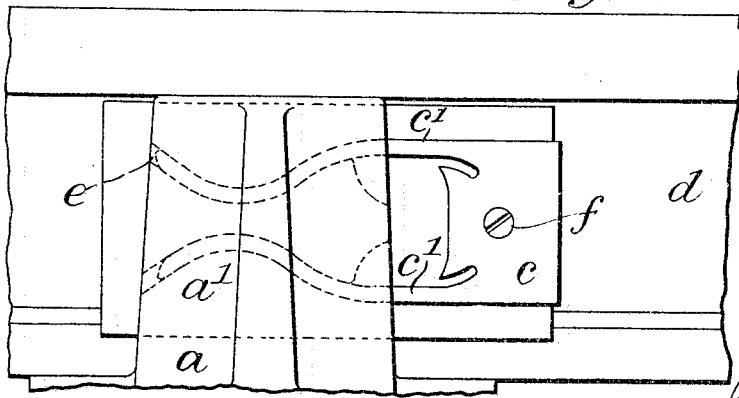
Figure 8:
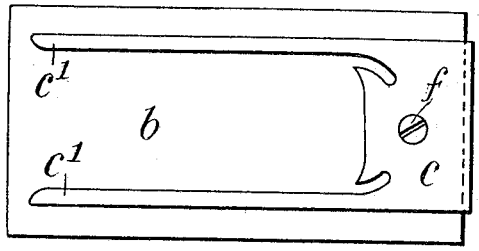
Figure 9:
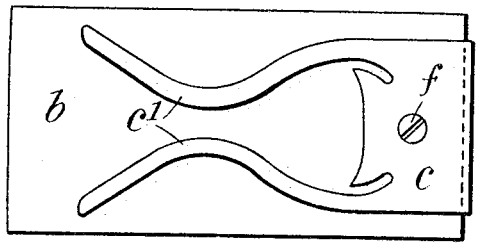
Figure 10:
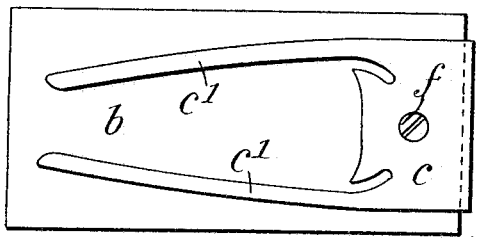
Figure 11:
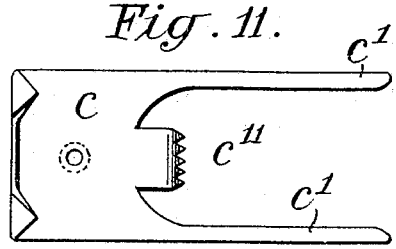
Figure 12:
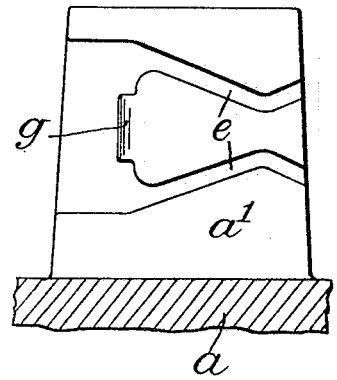
Figure 13:
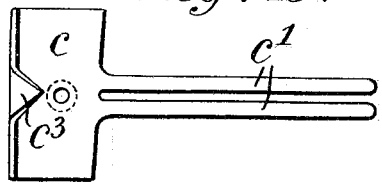
Figure 14:
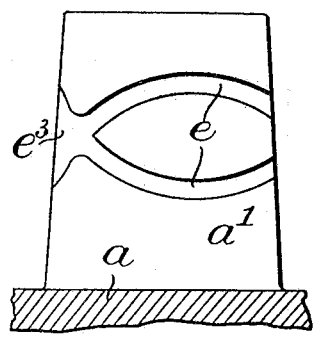
Figure 15:
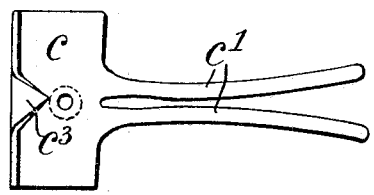
Fig. 15 shows the shape of the prongs after the plate has been driven out.
Figure 16:
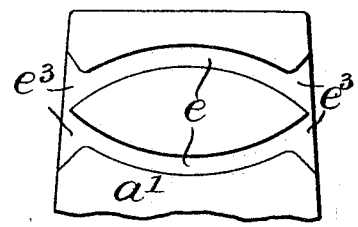
Figs. 16 and 17 illustrate portions of chair jaws in which the curved grooves $e$ are enlarged at both ends to facilitate the driving in of the keys provided with the locking plates in either direction.
Figure 17:
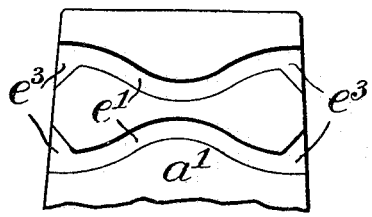
Figure 18:
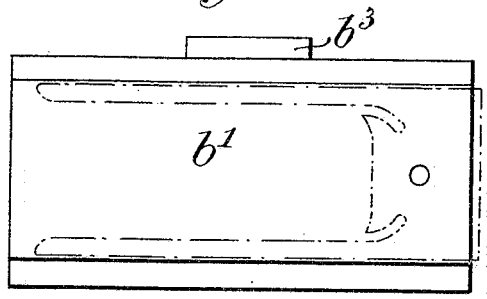
Figure 19:
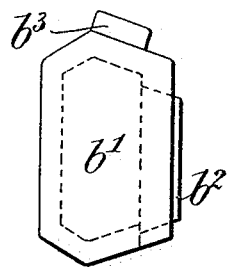
Figure 20:
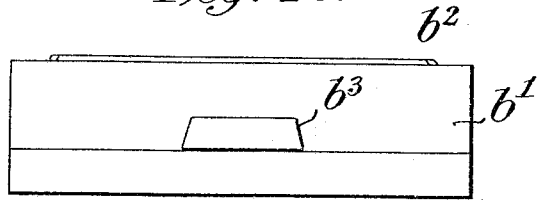
Figure 21:
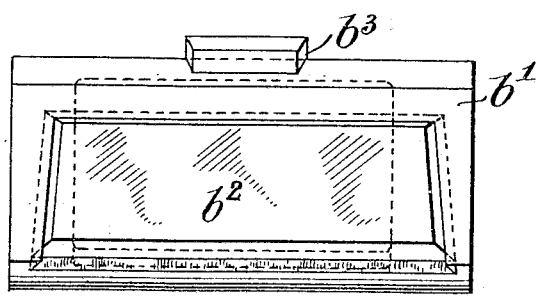

As shown in Figs. 18 to 21 the locking plate $c$ is applicable to cast iron keys $b^1$ these keys being recessed to receive wood compression strips $b^2$ which lie against the rail. The locking plate is shown in dotted lines in Fig. 18. Projections $b^3$ are cast on the key to provide an additional support under the rail head.

Figure 23:
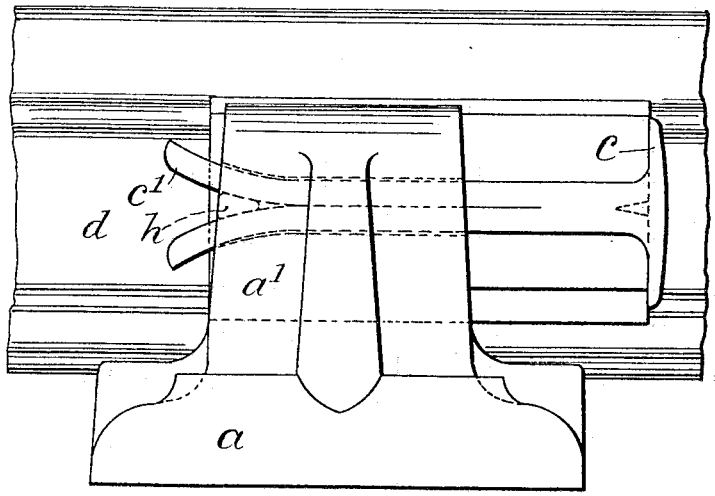
Figure 25:
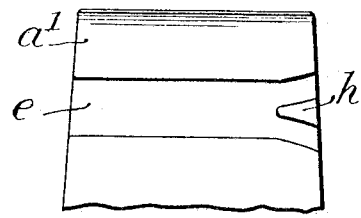

Referring now to Figs. 22 to 25 a single groove $e$ is formed in the chair jaw and the locking plate $c$ has a split shank forming prongs $c^1$ adapted to be bent outward by a wedge shaped projection $h$ in the groove $e$. A fixing tongue $c^3$ is stamped in the bent over end of the plate $c$.

What I claim, and desire to secure by Letters Patent is:—

1. A rail key fastening comprising a locking plate adapted to be applied between the key and chair jaw, and provided with parallel prongs and a rail chair formed with grooves in one jaw adapted to bend the prongs of the locking plate as the key is driven in between the chair jaw and rail, and thus fix the locking plate and key in position substantially as described.

2. In a rail key fastening a locking plate attached to the key and formed with resilient parallel prongs, and concavo-convexo means on the rail chair for engaging the prongs and bending same as the key is driven to fasten the key substantially as described.

3. A rail key fastening comprising in combination a rail chair having on one side thereof alternately converging and diverging grooves, a rail seated in said chair, a key intermediate said rail and said grooves and resilient parallel prongs secured to said key adapted to be forced into said grooves to prevent displacement of said key, said prongs adapted to substantially assure their removal from said grooves, whereby they may be used over again, and guiding means at the entrance to said grooves, substantially as described.

In testimony whereof I have affixed my signature, in presence of two witnesses.

GEORGE FREDERICK WILLIAMSON.

Witnesses:
JOHN. W. MACKENZIE,
KENNETH A. MACKENZIE.

Copies of this patent may be obtained for five cents each, by addressing the "Commissioner of Patents, Washington, D. C."